April 12, 1938.   E. E. HEWITT   2,113,618
BRAKE RETARDATION CONTROLLER
Original Filed Oct. 24, 1935
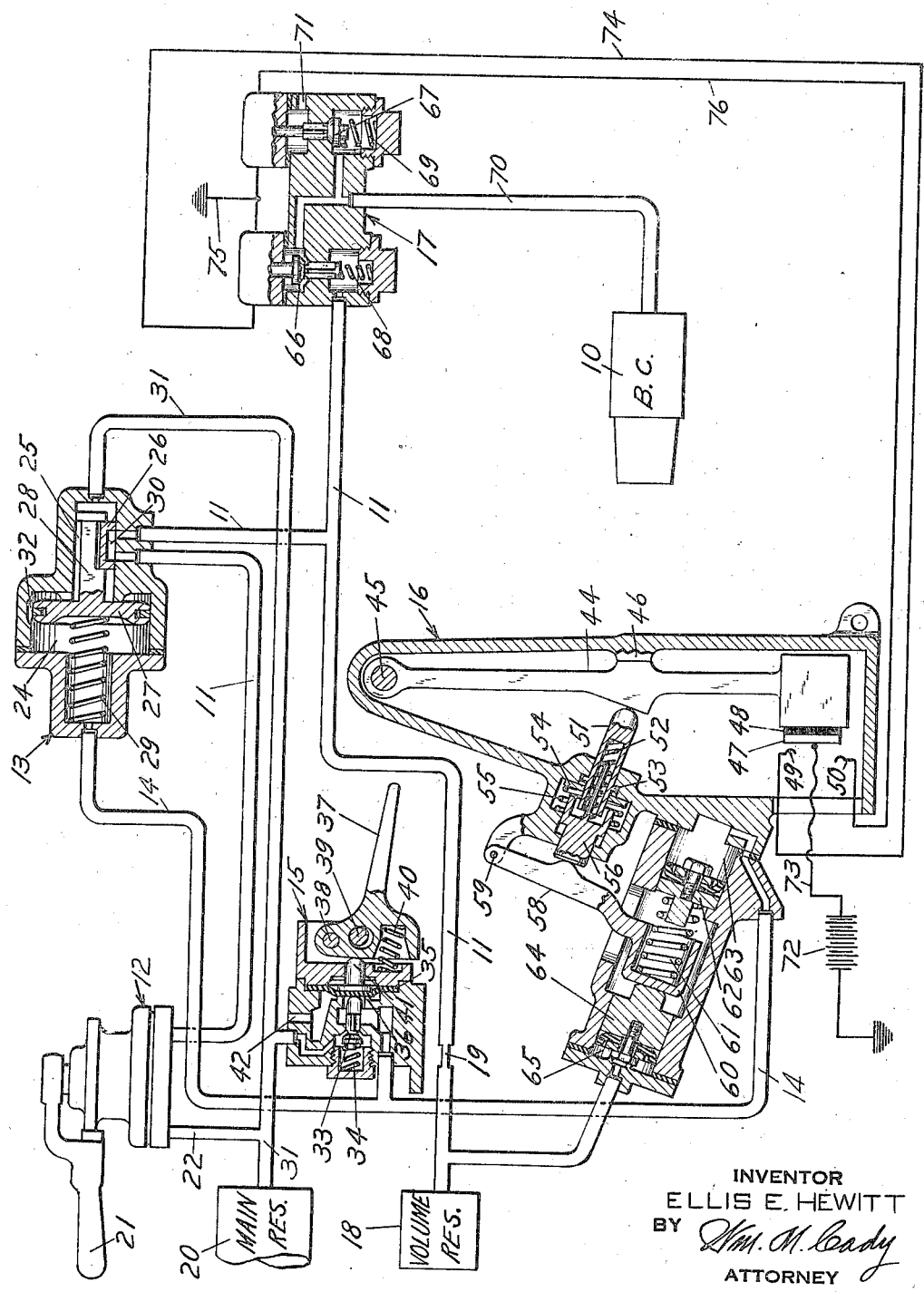
INVENTOR
ELLIS E. HEWITT
BY Wm. M. Cady
ATTORNEY Patented Apr. 12, 1938

2,113,618

UNITED STATES PATENT OFFICE 2,113,618

BRAKE RETARDATION CONTROLLER

Ellis E. Hewitt, Edgewood, Pa., assignor to The Westinghouse Air Brake Company, Wilmerding, Pa., a corporation of Pennsylvania Application October 24, 1935, Serial No. 46,462
Renewed July 1, 1936

18 Claims. (Cl. 303—24)

This invention relates to brake retardation controllers, and more particularly to retardation controllers for braking equipments intended for high speed trains and vehicles.

In the type of fluid pressure brake equipments more recently designed for high speed trains and vehicles, when an application of the brakes is effected the brake cylinder pressure will build up at an extremely fast rate. In practically all of these brake equipments a retardation controller device, or similar means, is provided to control the brake cylinder pressure so as to prevent the rate of retardation due to braking from exceeding some predetermined or chosen value.

Because the brake cylinder pressure may build up at an extremely fast rate, the pressure in the brake cylinder usually attains a value much higher than is required to produce the rate of retardation corresponding to the setting of the retardation controller device. This is due to the fact that the pressure developed in the brake cylinder is not immediately effective in producing retardation of the vehicle body, because there is always some slack and friction in the brake rigging, as well as differential motion between the vehicle truck and body. The retardation controller device therefore does not begin to function until the brake cylinder pressure has reached excessive values.

When the retardation controller device begins to function the brake cylinder pressure must then be initially reduced from an excessive value to the value which will just maintain the rate of retardation corresponding to the retardation controller setting. This not only results in an undue loss of fluid under pressure but the rapid initial reduction in brake cylinder pressure caused when the retardation controller device initially functions contributes toward producing an irregular and non-uniform stop. In addition, the rapid rise of brake cylinder pressure with the consequent high rate of retardation produced on the vehicle truck, followed by a rapid reduction of brake cylinder pressure at a time when the vehicle body is increasing in retardation, will usually produce severe shock in the connecting parts between the truck and vehicle body.

Moreover, the loss of pressure which results in reducing the brake cylinder pressure to the required value for maintaining the selected rate of retardation destroys some of the reserve which should be available in case an emergency application becomes necessary immediately following a service application. It is therefore desirable to prevent the brake cylinder pressure from initially rising beyond the value necessary to produce the chosen or selected rate of retardation.

It is a principal object of the present invention to provide means for so controlling the brake cylinder pressure as to substantially prevent it from rising above a value which will just produce the rate of retardation determined by the adjustment of the retardation controller device effected at the time the brake application is made.

A further object of the invention is to provide a brake system having a retardation controller device in which the retardation controller device is adjusted according to straight air pipe pressure, and in which the adjustment is delayed when an application is effected so that the retardation controller device may initially control brake cylinder pressure at a lower setting than that determined by the straight air pipe pressure.

A still further object of the invention is to provide a braking system in which the brakes may be applied by automatic operation or by straight air operation, both of which are under the control of a retardation controller device, which device during either mode of operation is adjusted during a delayed interval of time according to straight air pipe pressure, but which in automatic operation is adjusted to permit a higher rate of retardation than in straight air operation.

Still further objects of the invention dealing with specific constructions and arrangements of parts will be more fully understood from the following description, which is taken in connection with the single figure of the attached drawing, wherein I have shown an embodiment of my invention in the form of a combined straight air and automatic braking equipment for a single vehicle.

Referring now to this drawing, I have shown a simple form of braking equipment comprising a brake cylinder 10 to which fluid under pressure may be supplied through a straight air pipe 11, either by manual manipulation of a brake valve device 12, during straight air operation, or by operation of an emergency valve device 13, during automatic operation, in response to reductions of pressure in a normally charged safety control pipe 14, which reductions may be accomplished through operation of a vent valve device 15.

For controlling the pressure of fluid supplied to the brake cylinder 10 according to the rate of retardation of the vehicle, there are provided a retardation controller device 16, which is adjusted according to the pressure of fluid supplied to the straight air pipe 11, and a magnet valve device 17. For delaying the adjustment of the retardation controller device, there are provided a volume reservoir 18 and a restriction in the form of a choke 19 in the portion of the straight air pipe 11 connecting with the retardation controller device.

Considering now more in detail the devices above referred to, the brake valve device 12 may in the embodiment illustrated be one of the usual rotary valve types which controls the supply of fluid under pressure from a main reservoir 20 to the straight air pipe 11. The brake valve device is provided with a handle 21, which when in release position effects communication between the straight air pipe 11 and the atmosphere, but which when turned to a service position closes the communication to the atmosphere and connects the straight air pipe 11 to the main reservoir 20 by way of pipe 22.

The emergency valve device 13 is embodied in a casing having a piston chamber 24 and a slide valve chamber 25. Disposed in the slide valve chamber 25 is a slide valve 26, and disposed in the piston chamber 24 is a piston 27 having a stem 28 recessed to receive the slide valve 26, so as to move the slide valve coextensive with the movement of the piston.

A spring 29 urges the piston 27 toward a release position, in which position a cavity 30 in the slide valve 26 establishes communication between the two portions of the straight air pipe 11 connected to the emergency valve device.

The piston chamber 24 is connected to the safety control pipe 14, while the slide valve chamber 25 is connected to the main reservoir 20 by way of pipe 31. It is to be here understood that while the pipe 14 is referred to as a safety control pipe, it may be one of the other normally charged pipes commonly employed in automatic brake systems, such for example as the brake pipe, emergency pipe, or similar pipe.

When the pressure in piston chamber 24 and safety control pipe 14 is reduced, the overbalancing pressure in slide valve chamber 25 will shift the piston 27 and slide valve 26 to the left to application position, in which position the slide valve 26 blanks the left hand portion of the straight air pipe 11, and opens the right hand portion of the safety control pipe to the slide valve chamber 25. If the pressure in piston chamber 24 is reduced substantially to zero the piston and slide valve will remain in application position. When the pressure in piston chamber 24 is restored to normal, piston 27 and slide valve 26 will return to release position, where a feed groove 32 affords communication between the piston chamber and slide valve chamber.

The vent valve device 15 is embodied in a casing provided with a supply valve 33 which is urged toward a seated position by a spring 34, and also with a diaphragm valve 35 which is adapted to coact with a seat rib 36. The valve device is also provided with a hand or foot operated element 37, which is pivotally mounted to the casing of the valve device at 38 and which is adapted to have a limited up and down movement due to a pin 39 projecting into an aperture in the element. A spring 40 urges the element 37 toward an upper position.

When the element 37 is urged downwardly it engages a stem 41 to seat the diaphragm 35 on seat rib 36 and to unseat supply valve 33. When the diaphragm 35 is thus seated a communication between the safety control pipe 14 and the atmosphere by way of exhaust port 42 is cut off, while unseating of supply valve 33 connects the safety control pipe to the pipe 31 leading to the main reservoir 20. When the element 37 is permitted to be actuated by spring 40 to its upper position, valve 33 will be closed by spring 34, to close communication between the safety control pipe and the main reservoir 20, while diaphragm 35 will be actuated away from seat rib 36, and the communication between the safety control pipe and the atmosphere thus established.

The retardation controller device 16 is embodied in a casing having a pendulum 44 pivotally mounted at 45 and normally biased against a stop 46. The pendulum carries a contact 47 which is insulated therefrom by insulation 48, and which is adapted to sequentially engage stationary contacts 49 and 50.

The retardation controller device 16 is positioned on the vehicle so that when the vehicle is decelerating the pendulum is urged toward the left. Movement of the pendulum to the left is opposed by a spring pressed plunger 51 which is urged into contact with the pendulum by a spring 52. The spring 52 opposes movement of the pendulum to the left until contact 47 has engaged contact 49, and thereafter a flange 53 on the plunger 51 engages a washer 54 so that a spring 55 will also oppose movement of the pendulum as the contact 47 moves toward engagement with the contact 50.

The tension on the spring 52 may be adjusted or varied by variable forces applied to a movable abutment 56 bearing upon the spring. The spring 55, however, is invariable, so that regardless of the variable tension on spring 52, after the flange 53 has engaged the washer 54 a substantially constant increment of force only will be required to move the pendulum far enough to the left to cause contact 47 to engage contact 50. Thus it will be apparent that although variable rates of retardation may be required to cause contact 47 to engage contact 49 a substantially constant increment only of retardation will be required to move the pendulum further to cause contact 47 to engage contact 50.

For varying the tension on the spring 52 there is provided a mechanism comprising a lever 58 pivotally mounted at 59 and having integral with the other end a spring cup 60 in which is disposed one end of a spring 61. The other end of the spring 61 bears upon a piston 62 disposed in a chamber 63, which is connected to the safety control pipe 14.

The spring cup 60 is in abutting engagement with a second piston 64 disposed in a piston chamber 65, which chamber is connected to the straight air pipe 11. If the safety control pipe 14 is maintained charged to normal pressure value the pressure in the piston chamber 63 will be a maximum and piston 62 will be positioned as shown in the drawing. Thus if now fluid under pressure is supplied to a given degree to the chamber 65 from the straight air pipe 11, piston 64 will be actuated inwardly to compress spring 61 and thus increase the tension on adjusting spring 52 accordingly. But if the safety control pipe pressure is reduced while the parts are in the position as shown in the drawing, the tension on spring 61 will be decreased so that if fluid under pressure is supplied to the chamber 65 to the same degree as before there will be produced a greater tension on the adjusting spring 52.

The magnet valve device 17 is embodied in a casing provided with a cut-off valve 66 and a release valve 67. A spring 68 urges the cut-off valve 66 toward unseated position, while a cut-off electromagnet (not shown) in the upper part of the valve device casing functions when energized to actuate the valve toward seated position.

Similarly, a spring 69 urges the release valve 67 toward seated position, while a release electromagnet (not shown) in the upper part of the casing functions when energized to actuate the valve toward unseated position.

When the release valve 67 is seated and the cut-off valve 66 unseated, communication is established between the straight air pipe 11 and a brake cylinder pipe 70 leading to the brake cylinder 10. When the cut-off valve 66 is seated and the release valve 67 is unseated, communication between these two pipes is cut off and pipe 70 is connected to the atmosphere by way of exhaust port 71.

The operation of this embodiment of my invention is as follows:

When the vehicle is running the handle 21 of the brake valve device 12 will be maintained in release position, while the operator maintains the element 37 of the vent valve device 15 depressed. The parts of the various devices will therefore be in the positions as shown in the drawing.

*Service or straight air application*

When it is desired to effect a service application of the brakes, as for example a full service application, the brake valve handle 21 is turned to service position where it may be left. Fluid under pressure will then flow from the main reservoir 20 to the brake cylinder 10, by way of pipe 22, brake valve device 12, the first portion of the straight air pipe 11, cavity 30 in slide valve 26 of the emergency valve device 13, the second portion of the straight air pipe 11, past the cut-off valve 66 in the magnet valve device 17, and through pipe 70. This flow takes place at a rapid rate so that pressure in the brake cylinder builds up extremely fast.

Fluid supplied to the straight air pipe 11 also flows through the choke 19 to the volume reservoir 18 and to the piston chamber 65 in the retardation controller device.

Now let it be assumed that it is desired to retard the vehicle at a rate of retardation of four miles per hour per second, and that the ultimate pressure of fluid supplied to the straight air pipe 11 in a full service application will adjust the retardation controller device 16 for this rate. Let it be further assumed that an initial brake cylinder pressure of seventy-five pounds will produce the desired rate of retardation of four miles per hour per second. The main reservoir 20 will, however, be assumed to be capable of producing an ultimate pressure of one hundred pounds in the brake cylinder. Therefore, with the brake valve handle left in service position the brake cylinder pressure may ultimately rise to one hundred pounds, whereas seventy-five pounds only is required to produce the desired retardation.

Now the choke 19 and volume reservoir 18 are so proportioned that while the pressure in the brake cylinder 10 is increasing rapidly the pressure in the piston chamber 65 of the retardation controller device is increasing slowly. The rapidly increasing brake cylinder pressure will cause the vehicle to decelerate at an increasing rate, so that a lower rate of retardation than four miles per hour per second will actuate the pendulum 44 to the left far enough for contact 47 to engage contact 49.

The parts are preferably adjusted so that at or about the time the brake cylinder pressure reaches seventy-five pounds the pendulum 44 will have swung far enough to the left for contact 47 to engage contact 49. When this takes place the cut-off electromagnet in the magnet valve device 17 will be energized through a circuit, which beginning at battery 72 includes, conductor 73, contacts 47 and 49, conductor 74, the cut-off electromagnet, and ground connection 75. The energization of the cut-off electromagnet will effect seating of the cut-off valve 66, and thus prevent further supply of fluid under pressure to the brake cylinder 10.

This will, however, not affect the supply to the piston chamber 65, which will continue until the retardation controller device has been adjusted for the desired setting of four miles per hour per second. By the time this setting will have been accomplished, the seventy-five pounds pressure in the brake cylinder will be producing the desired rate of retardation, so that the pendulum 44 will be maintained in the position where contacts 47 and 49 remain in engagement. Thus the brake cylinder pressure is prevented from rising beyond the value necessary to produce the desired retardation.

When the brakes are initially applied the brake shoes are cold and the coefficient of friction between the shoes and wheels is relatively high. As the brake shoes heat up the coefficient of friction will tend to diminish, so that the braking effect and hence the retardation will tend to diminish somewhat. If additional pressure in the brake cylinder is required to maintain the desired rate of retardation, the movement of pendulum 44 to the right due to the diminishing retardation will disengage contact 47 from contact 49 and thus effect unseating of the cut-off valve 66, to increase the brake cylinder pressure.

On the other hand, if as the vehicle slows down the coefficient of friction between the shoes and wheels should increase so that pendulum 44 moves further to the left, to the point where contact 47 engages contact 50, the release electromagnet in the magnet valve device 17 will be energized through a circuit which includes, beginning at battery 72, conductor 73, contacts 47 and 50, conductor 76, the release electromagnet, and ground connection 75. Release valve 67 will thus be unseated to release fluid under pressure from the brake cylinder 10 to the atmosphere and thus diminish the degree of braking.

A little thought will show that the retardation controller device 16 will thus function to regulate the brake cylinder pressure so as to maintain a rate of retardation of substantially four miles per hour per second.

To release the brakes following a straight air application the brake valve handle 21 is turned to release position, whereupon the straight air pipe 11 is disconnected from the main reservoir 20 and connected to the atmosphere.

*Emergency or automatic application*

When it is desired to effect an emergency or automatic application, pressure manually applied to the element 37 of the vent valve device 15 is released, so that spring 40 actuates the element upwardly, thus effecting seating of the supply valve 33 and unseating of the diaphragm valve 35. The safety control pipe is thus vented to ject to the pressure of fluid supplied to a second chamber for controlling movement of said first abutment.

16. In a retardation controller device, in combination, a body movable in response to a force of inertia, spring means for opposing movement of said body, means operated upon an increase in pressure for varying the tension on said spring means, and means operated upon a decrease in pressure for controlling the degree of variation of tension on said spring means due to operation of said last means.

17. The method of controlling vehicle brake applications, which comprises, effecting an application of the brakes to a potentially high degree, lapping the application at a relatively low rate of retardation of the vehicle and before the degree of application has reached the said high degree, holding the application lapped for an interval of time sufficient for the body and truck of the vehicle to assume relatively to each other fixed positions, and thereafter controlling the degree of application so as to maintain a substantially constant rate of retardation of the vehicle higher than said relatively low rate.

18. The method of controlling brake cylinder pressure in a fluid pressure brake system for vehicles, which comprises, effecting a supply of fluid under pressure to the brake cylinder with sufficient supply capacity to attain a chosen brake cylinder pressure, lapping the supply to the brake cylinder at a pressure lower than said chosen pressure when the rate of retardation of the vehicle approaches a relatively low value, holding brake cylinder pressure lapped until the body and vehicle truck assume relatively fixed positions, and thereafter regulating brake cylinder pressure in a manner to produce a relatively high constant rate of retardation of the vehicle.

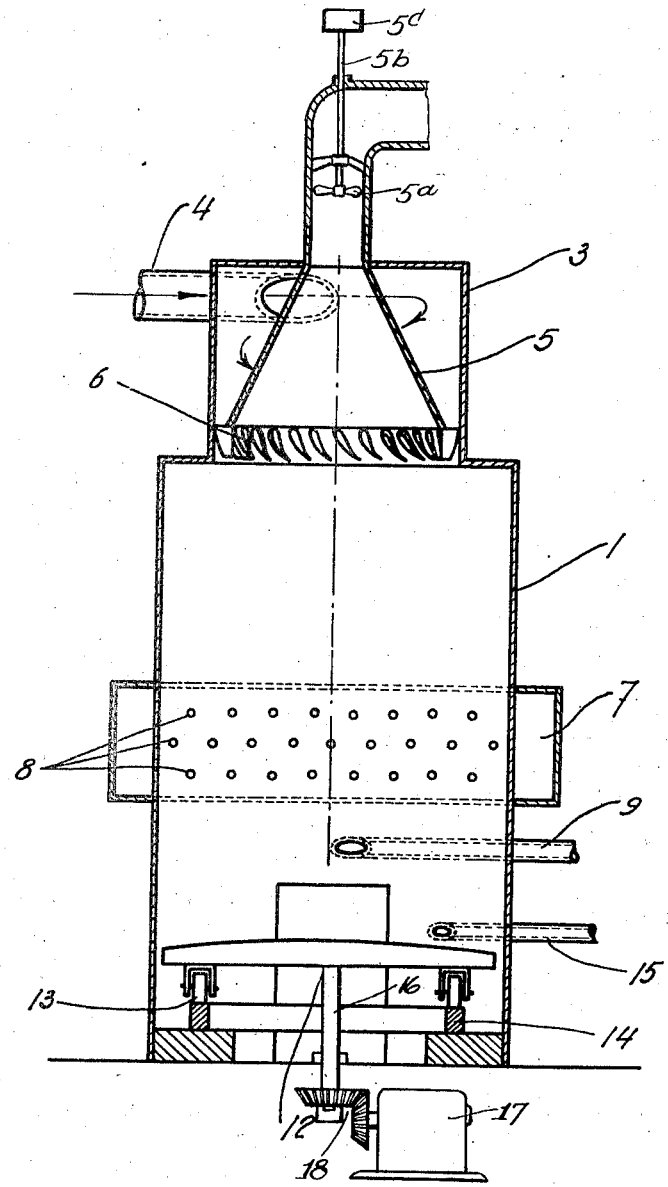

ELLIS E. HEWITT.